(12) United States Patent
Gonschor et al.

(10) Patent No.: US 7,042,638 B2
(45) Date of Patent: May 9, 2006

(54) DEVICE FOR COUPLING LIGHT INTO A MICROSCOPE

(75) Inventors: Matthias Gonschor, Gleichen (DE); Carsten Hoyer, Juehnde (DE); Michael Brehm, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/613,394

(22) Filed: Jul. 3, 2003

(65) Prior Publication Data
US 2004/0047032 A1 Mar. 11, 2004

(30) Foreign Application Priority Data
Jul. 4, 2002 (DE) ................. 102 29 935

(51) Int. Cl.
*G02B 21/06* (2006.01)
(52) U.S. Cl. ............ 359/385; 359/388; 359/390
(58) Field of Classification Search ........ 359/368, 359/372, 385–390
See application file for complete search history.

(56) References Cited

U.S. PATENT DOCUMENTS 6,792,138 B1 * 9/2004 Hasegawa et al. ........ 382/128

2002/0181096 A1 * 12/2002 Sasaki ................ 359/389

FOREIGN PATENT DOCUMENTS

DE    199 23 563    12/2000

OTHER PUBLICATIONS

Daniel Axelrod, et al.: Stout and Axelrod, "Evanescent field excitation of fluorescence by epi-illumination microscopy", Dec. 1989, *Applied Optics*, vol. 28, No. 24, p. 5237.
Sund, Swanson and Axelrod, "Cell Membrane Orientation Visualized by Polarized Total Internal Reflection Fluorescence", Oct. 1999, *Biophysical Journal*, vol. 77.
Zenisek, Steyer and Almers, "Transport, capture and exocytosis of single vesicles at active zones", Aug. 2000, *Nature*, vol. 406.

* cited by examiner

*Primary Examiner*—Drew A. Dunn
*Assistant Examiner*—Joshua L. Pritchett
(74) *Attorney, Agent, or Firm*—Reed Smith LLP

(57) ABSTRACT

The invention is directed to a device for coupling light into the beam path of a microscope. Laser light is directed to the preparation in the field diaphragm plane through an in-coupling light-conducting fiber constructed as a slide. The invention is particularly suitable for the TIRF method.

9 Claims, 3 Drawing Sheets

US 7,042,638 B2

DEVICE FOR COUPLING LIGHT INTO A MICROSCOPE

CROSS-REFERENCE TO RELATED APPLICATION

This application claims priority of German Application No. 102 29 935.8, filed Jul. 4, 2002, the complete disclosure of which is hereby incorporated by reference.

BACKGROUND OF THE INVENTION a) Field of the Invention

The invention is directed to a device for coupling light into the reflected light beam path of a microscope. It is applicable in particular for implementing the known microscopy method of total internal reflection fluorescence (TIRF) in which light is radiated into the specimen or preparation to be examined at an angle greater than the angle of total reflection at the interface or boundary layer between the coverslip and the preparation. Through total reflection, the preparation is illuminated by an evanescent field which only has a penetration depth of 100–200 nm. Therefore, fluorescence excitation can only come about in this range and during detection of the fluorescence signal the signal-to-noise ratio can be improved over conventional methods.

b) Description of the Related Art

This is used, for example, to examine intracellular and intercellular transport processes at cell membranes, etc., located directly on the surface of the coverslip.

The first experiments were described by Daniel Axelrod, et al.: Stout and Axelrod, "Evanescent field excitation of fluorescence by epi-illumination microscopy", Dec. 1989, *Applied Optics*, Vol. 28, No. 24, page 5237; Sund, Swanson and Axelrod, "Cell Membrane Orientation Visualized by Polarized Total Internal Reflection Fluorescence", Oct. 1999, *Biophysical Journal*, Vol. 77. Additional references include Zenisek, Steyer and Almers, "Transport, capture and exocytosis of single vesicles at active zones", Aug. 2000, *Nature*, Vol. 406.

In principle, there are two possibilities for carrying out TIRF microscopy: with transmitted light and with reflected light.

a) In the transmitted light variant, the condenser must be replaced by a laser in-coupling prism system such as is known, e.g., from DE 199 23 563 A1 of Dec. 7, 2000. This solution has a number of disadvantages. It is unsuitable for inverted microscopes because the space required over the preparation in these microscopes is hidden by the prism, so that access to the preparation which is needed for many experiments is blocked.

b) The reflected light variant requires an objective with a sufficiently high numerical aperture on the one hand and a coupling in of the laser through this objective on the other hand. In known solutions, the laser is coupled in through the epi-fluorescence beam path and requires that the standard reflected illumination be replaced by a special version, or a beam path parallel to the standard reflected illumination is used for a TIRF laser in-coupling. A solution of this kind is produced by the firm T.I.L.L. Photonics under the trade name TILL-TIRF Module. Exchanging the entire reflected illumination apparatus makes the system expensive and inflexible.

OBJECT AND SUMMARY OF THE INVENTION

It is the primary object of the invention to overcome the disadvantages of the prior art and to provide a simple and versatile coupling of light into the reflected light beam path of a microscope.

This object is met in a device for coupling light into a microscope, the light being used for illuminating a preparation in the beam path of the microscope which has an objective and tube lens and a reflected light illumination device which comprises a light source and a condenser. The condenser images the light source in the field diaphragm plane and, in so doing, defines an optical axis. The device is characterized in that an at least partially reflecting element is provided in the vicinity of the field diaphragm plane and reflects light from a second light source into the beam path at a slight angle relative to the optical axis.

The particular advantage of the solution according to the invention consists in that an access which is standard in most microscopes and which is provided per se for receiving special devices for contrasting (e.g., DIC slides) can be used for coupling in light of a second light source, e.g., a laser, without needing to make further changes in the illumination beam path.

The light beam can be directed to the edge area of the exit pupil of a high-aperture objective in a particularly simple manner by providing the possibility of inclining the coupled in light beam relative to the optical axis, so that the TIRF method can be realized. The pre-adjusted base inclination of the coupled in beam relative to the optical axis particularly simplifies the adjustment required for carrying out the TIRF method.

The invention can also be used in an analogous manner for illuminating the preparation with a laser light source when the light is coupled in parallel to the optical axis.

The invention is explained more fully in the following with reference to the embodiment examples in FIGS. 1 to 3.

DESCRIPTION OF THE PREFERRED EMBODIMENTS

Figure 1:
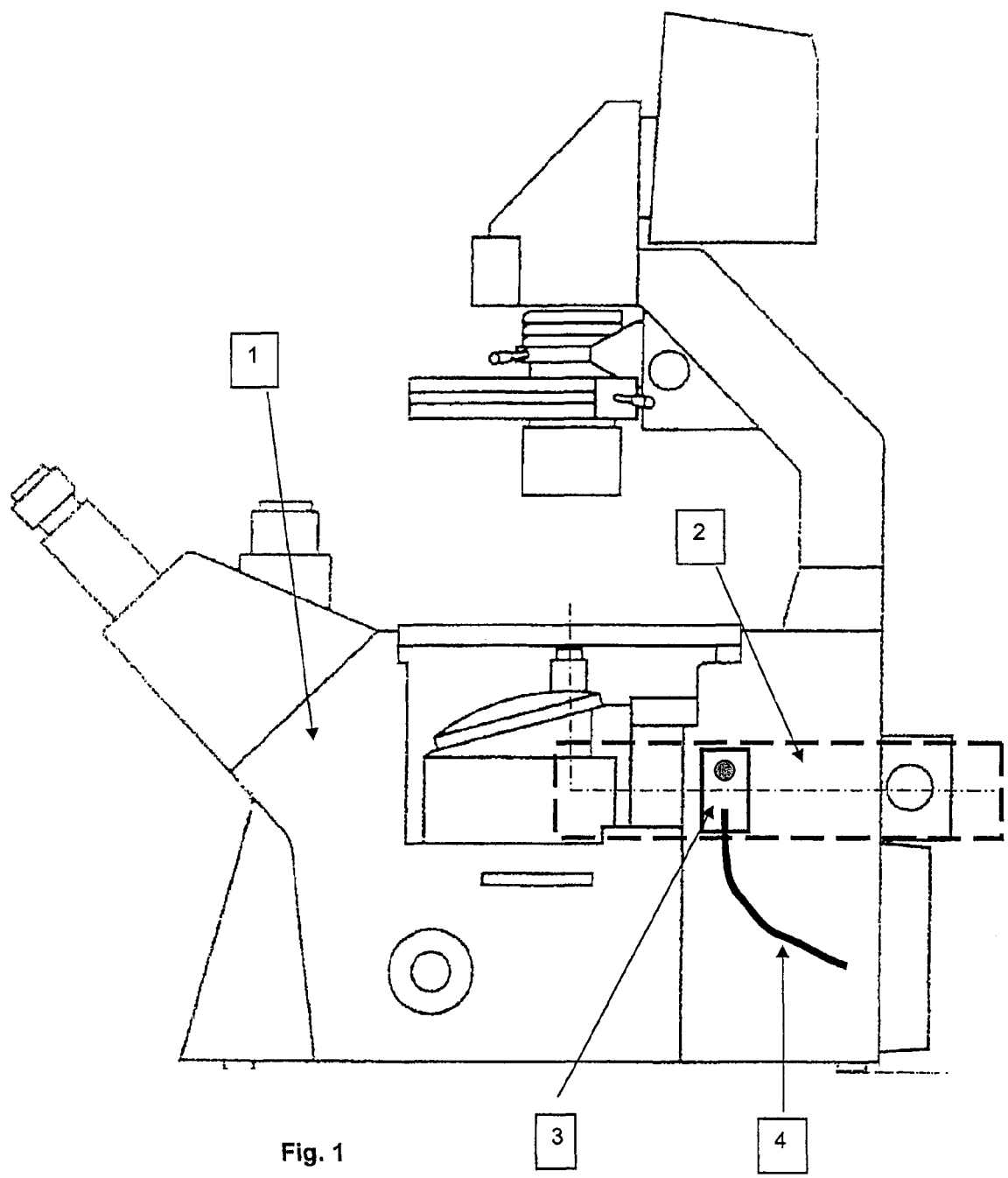
FIG. 1 shows a schematic view of a microscope with the coupling in of light according to the invention.

A microscope 1 (an inverted microscope, in this case) having a standard reflected light illumination 2 is shown schematically in FIG. 1. Light from a second light source (e.g., a laser) is coupled into the reflected light beam path via a light-conducting fiber 4 by means of a slide 3 according to the invention.

Figure 2:
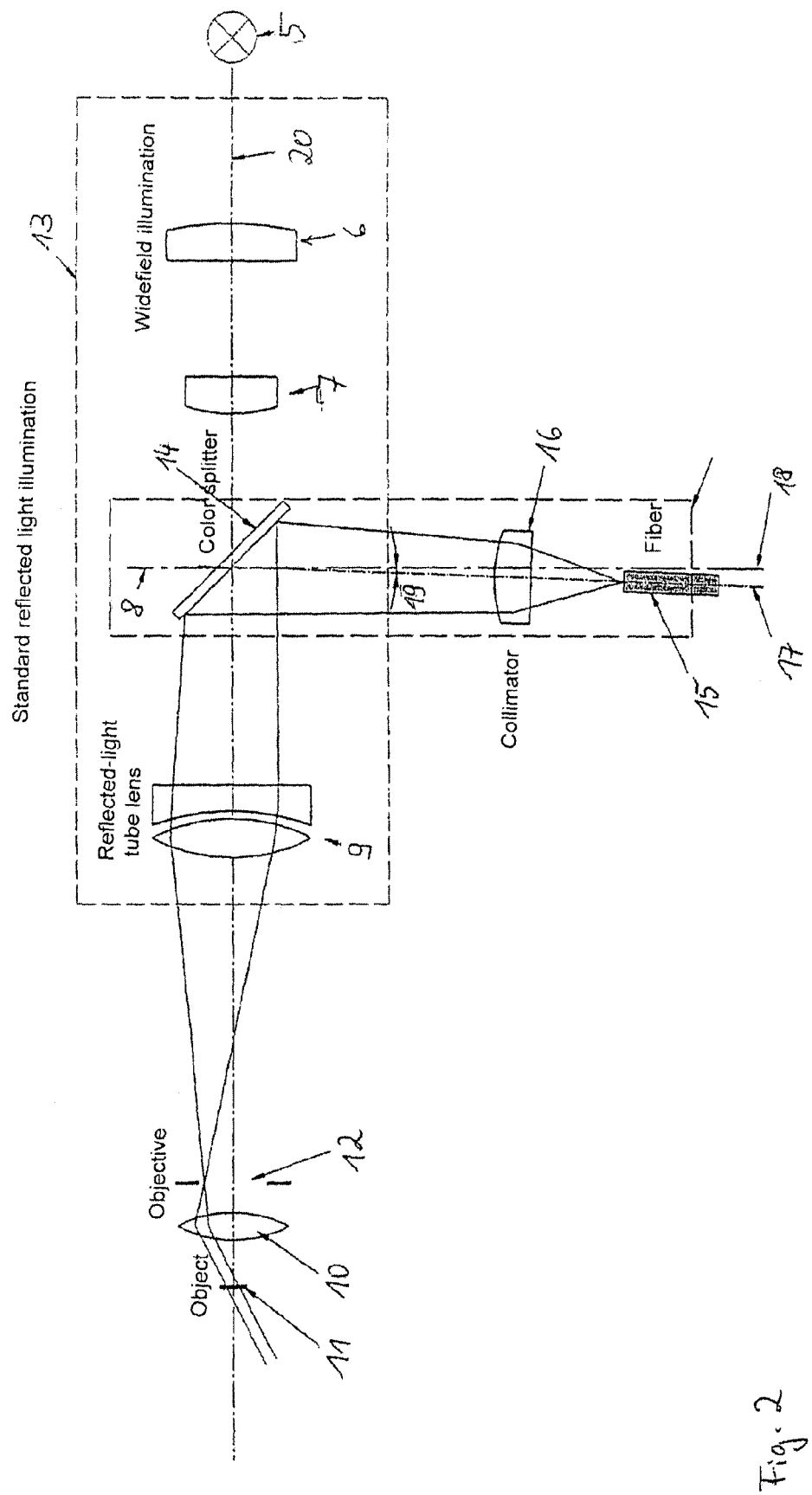
FIG. 2 shows the optical beam path of the light in-coupling.

In FIG. 2, the optical beam path of a microscope is imaged by coupling in light according to the invention. A light source 5, e.g., a halogen lamp, is imaged in the field diaphragm plane 8 by a collimator 6 and a relay lens 7. This is imaged in the object plane 11 by the reflected light tube lens 9 and the objective 10. An objective exit pupil 12 is associated with the objective 10. Together, the collimator 6, relay lens 7 and reflected light tube lens 9 form the standard reflected light illumination 13. A reflecting element 14 which couples the light, preferably of a laser, coming from a light-conducting fiber 15 into the illumination beam path of the microscope is arranged in the plane of the field diaphragm 8. An achromatic or aspheric collimator 16 focuses the light bundle exiting in divergent manner from the fiber 15 in the exit pupil 12 of the objective via the tube lens 9. The illumination axis 17 of the collimated laser light is inclined by a determined base angle 19 relative to the illumination axis 18 of the microscope. This inclination causes the expanded laser beam to be focused through the reflected tube lens 9 in the edge area of the objective exit pupil 12. This angle of inclination 19 is dependent on the respective optical ratios (optical length of the beam path, focal length of the tube lens) and is approximately 2° in the Axiovert 200 microscope manufactured by the present Applicant. This preset angle of inclination 19 has the advantage that the lateral fine-adjustment of the laser focus in the exit pupil of the objective can be achieved in a very simple manner by a slight tilting movement of the illumination axis of collimator optics 16 and fiber 15. When needed, the focus position of the laser spot can be achieved by a slight focusing of the collimator optics 16.

The reflecting element 14 is constructed as a color splitter whose refection characteristics are selected in such a way that the laser light is reflected in optimal manner, but the light of the standard light source 5 is passed virtually unimpeded.

The color splitter 14 which is arranged centrally on the optical axis 20 of the reflected light illumination 13 is struck in the center by the light bundle from the fiber 17 in this way. Because of the adjusted base inclination, the color splitter 14 can have a small diameter since there is practically no lateral offset when the unit comprising the collimator 16 and fiber 15 is tilted for angular adjustment. For fine adjustment of the angle, tilting is only necessary in the minute range, so that it does not lead to vignetting.

Figure 3:
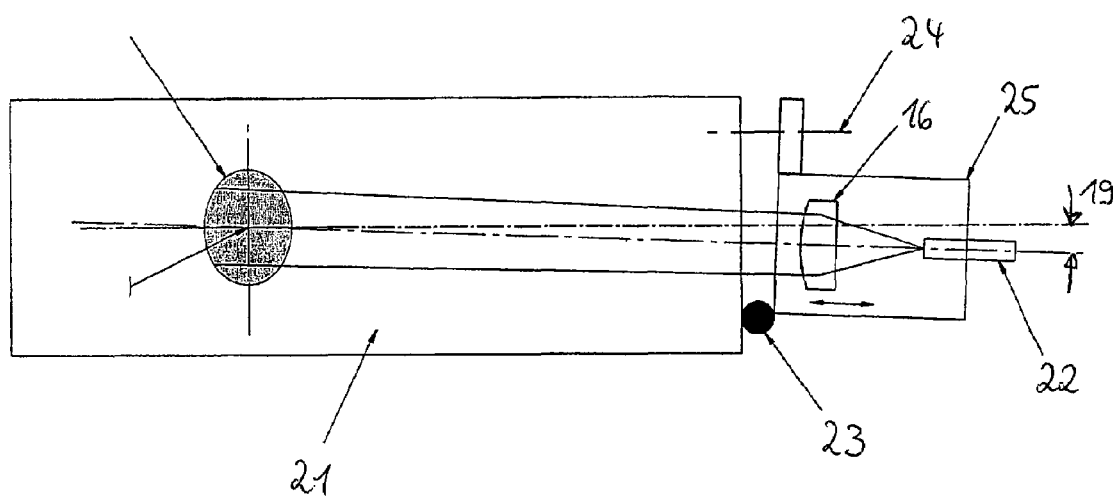
FIG. 3 shows a schematic view of the realization of the invention in the form of a microscope slide.

FIG. 3 shows the light in-coupling according to the invention as a microscope slide 21 in which the fiber receptacle 22, collimator 16 and deflecting color splitter 14 are mounted and oriented. The collimator 16 with the fiber receptacle 22, combined in a unit 25, is tilted in addition to the base inclination 19, e.g., by means of a solid state joint 23 by of a micrometer screw 24 (shown schematically), for the fine adjustment and angle matching for the TIRF method.

Implementation of the invention is not limited by the embodiment example shown herein. For example, the base inclination 19 can also be realized by means of a preset tilt of the color splitter 14.

If the light in-coupling is used only to couple in a second (laser) light source, a base angle 19 of 0° should be selected.

While the foregoing description and drawings represent the present invention, it will be obvious to those skilled in the art that various changes may be made therein without departing from the true spirit and scope of the present invention.

What is claimed is:

1. A device for coupling in light for illuminating a preparation in the beam path of a microscope which has an objective and tube lens and a reflected light illumination device which comprises a light source and a condenser, wherein the condenser images the light source in the field diaphragm plane and, in so doing, defines an optical axis, comprising:

an at least one partially reflecting element being provided in the vicinity of the field diaphragm plane and reflecting light from a second light source into the beam path at a slight angle relative to the optical axis, wherein the at least one partially reflecting element, a holder of a light-conducting fiber and an optical system are combined in a mechanical unit, and wherein the mechanical unit is constructed as a slider, the slider being adapted to be slid into the microscope.

2. The device for coupling light into the beam path of a microscope according to claim 1, wherein the second light source is a laser.

3. The device for coupling light into the beam path of a microscope according to claim 1, wherein the angle at which the light of the second light source is reflected into the beam path is adjustable.

4. The device for coupling light into the beam path of a microscope according to claim 1, wherein the at least one partially reflecting element reflects the light of the second light source into the beam path parallel to the optical axis.

5. The device for coupling light into the beam path of a microscope according to claim 1, wherein the at least one partially reflecting element is arranged at an angle of 45° to the optical axis.

6. The device for coupling light into the beam path of a microscope according to claim 1, wherein the light-conducting fiber is provided which is held in such a way that the at least one partially reflecting element is acted upon by the light of the second light source by the optical system.

7. The device for coupling light into the beam path of a microscope according to claim 6, wherein the holder of the light-conducting fiber has a device for adjusting the inclination.

8. The device for coupling light into the beam path of a microscope according to claim 7, wherein the holder of the light-conducting fiber has a base inclination relative to the optical axis.

9. The device for coupling light into the beam path of a microscope according to claim 6, wherein the optical system can be focused.

* * * * *